United States Patent [19]
Robertson et al.

[11] Patent Number: 4,893,310
[45] Date of Patent: Jan. 9, 1990

[54] DIGITAL KEY TELEPHONE SYSTEM

[75] Inventors: David J. Robertson, Ottawa, Canada; Ronald J. Maginley, Ann Arbor, Mich.; Alan S. J. Chapman, Kanata, Canada; Terence N. Thomas, Nepean, Canada; Nadir Nizamuddin, Kanata, Canada; John W. J. Williams, Kanata, Canada; Alan M. Redmond, Kanata, Canada; Robert S. Morley, Ottawa, Canada

[73] Assignee: Northern Telecom Limited, Montreal, Canada

[21] Appl. No.: 166,345

[22] Filed: Mar. 10, 1988

Related U.S. Application Data

[63] Continuation-in-part of Ser. No. 126,710, Nov. 30, 1987.

[51] Int. Cl.⁴ .......................... H04J 3/12; H04Q 11/04
[52] U.S. Cl. .................................. 370/110.1; 370/58.2
[58] Field of Search .................. 370/110.1, 58, 67, 66; 379/165

[56] References Cited
U.S. PATENT DOCUMENTS

| | | | |
|---|---|---|---|
| 4,430,733 | 2/1984 | Hardy et al. | 370/110.1 |
| 4,514,597 | 4/1985 | Kikuchi et al. | 379/165 |
| 4,602,132 | 7/1986 | Nagatomi et al. | 379/165 |
| 4,615,028 | 9/1986 | Lewis et al. | 370/110.1 |
| 4,730,304 | 3/1988 | Mezera et al. | |
| 4,763,316 | 8/1988 | Schaich et al. | |

Primary Examiner—Benedict V. Safourek
Assistant Examiner—Wellington Chin
Attorney, Agent, or Firm—Foley & Lardner, Schwartz, Jeffery, Schwaab, Mack, Blumenthal & Evans

[57] ABSTRACT

A key telephone system includes a plurality of ports being linked by port associated bidirectional communication channels which are synchronously switched by transferring bit states between ones of the channels to provide communication paths between the ports as directed by a central processor. The ports are also linkable to and via the central processor by port associated message channels. An interface circuit is responsive to the central processor and message channel signals for regulating flow of messages received by the central processor and for effecting single and plural channel distribution of messages from the central processor. The message channels permit telephony operating features and functions to be provided either within the central processor or by appropriate apparatus means being connected at any of the ports.

16 Claims, 10 Drawing Sheets

DIGITAL KEY TELEPHONE SYSTEM

CROSS-REFERENCE TO RELATED APPLICATIONS

This a continuation-in-part of application Ser. No. 126,710 entitled "Digital Key Telephone System" which was filed on Nov. 30, 1987 by George Irwin et al.

FIELD OF THE INVENTION

The invention is in the field of small telephone systems and the like, sometimes referred to as key telephone systems. More particularly, the invention relates to signalling and supervision messaging functions in a digital key telephone system, one example of which is disclosed in a co-pending application entitled "Digital Key Telephone System", serial number 126,710, which was filed on Nov. 30, 1987 by George Irwin et al.

BACKGROUND OF THE INVENTION

Some examples of small telephone systems have been generally referred to as key telephone systems. Traditionally a key telephone system is provided by extensive telephone line and control lead wiring between key telephone sets. Each key telephone line extends to a telephone exchange. Each of the telephone sets includes a plurality of push button switches or keys, each for connecting the telephone set to a particular telephone line among a plurality of telephone lines routed to the key telephone set. The switching function of line selection is mechanically provided and distributed among the key telephone sets. Any features in addition to plain ordinary telephone service (POTS) must be added on a per line basis. The primary advantage of these systems is economy with small size. However, if such a system is required to expand along with the organization it serves, over a time it eventually becomes more expensive on a per line and feature basis than a private branch exchange would be. Key telephone systems are also characteristically of the analog signal type, and therefore are impractical to interface with an ISDN as will likely be desired by business customers in the near future.

SUMMARY OF THE INVENTION

It is an object of the invention to provide a telephone system wherein the functional advantages of key telephone systems and digital signal communications are coexistent via station apparatus connected to the system.

In essence, an example of the key telephone system includes a central unit (KSU), and a number of stations. Stations may be, but are not limited to be, telephone sets. Other forms of stations include data sets and interface units to C.O. trunks. A general purpose computer, for example a personal computer, may act as a station, with a suitable interface unit. Stations are connected to KSU ports using digital signals over twisted wire pairs. Some stations may physically be part of the KSU, and be connected thereto by means other than twisted pair. The KSU itself may include more than one physical unit.

A primary function of the key telephone system is to provide point to point communication between the stations, in the form of switched, bidirectional, 64 kb/s S and S channels. In one example, each station has access to two such channels. Each station also has access to a 16 kb/s S and S channel used for system purposes such as signalling and supervision. Each station, and the KSU, contain some form of processing device, for example, a software controlled microprocessor, or a logic network. The S and S channel allows one station at a time to send a digitally encoded message to the KSU. More specifically, it allows the processing device at the station to send such a message to the processing device in the KSU. This reference to processing devices should be assumed wherever the action of a station or the KSU is mentioned. The S and S channel similarly allows the KSU to send a message to any one or more stations.

Each message is of a defined format. In this example there are two formats, each of which require control information. Depending on the control information in an incoming message to the KSU, the KSU may retransmit that message to stations as just described. Hence, a station may indirectly send a message to any other station or to all stations, by relying on this KSU operation. The KSU operates in accordance with information contained in the messages, to set up and tear down 64 kb/s circuit connections between stations. Stations use such a connection for PCM voice, or for data, or as another means to exchange messages.

The operation of a station is controlled directly by the processing element at that station. The processing element runs a low level program, and may run higher level programs. The low level program controls indicators and other devices at the station, senses the state of input devices, and handles generation and interpretation of messages. A higher level of program may control the sequences of operation of the station, and co-operate with other higher level programs at other stations or in the KSU to provide desired operation of the key telephone system as a whole. The behavior of a station is determined by the program running in that station, or by messages received from a program running in the KSU. The operation may be wholly or partially determined by a program running in some other station, including the case where that station is attached to or incorporates a general purpose digital computer.

Since the behavior of a station may be determined by the program running in another station, it is possible to add new types of stations, as such become available, or to install new software in existing stations, to affect the behaviour of previously connected stations. Thus an added station may provide new features, possibly requiring novel sequences of keystrokes and display and indicator operation. The new feature is or may be made available at existing stations without reprogramming those stations or the KSU.

The added station providing the new feature may in fact be a reprogrammable device such as a personal computer. Thus new features may be added solely by software change or addition in an attached computer system, by techniques generally available, without participation of the key telephone system manufacturer or vendor. Of course, all of this extreme freedom of access to and control of the communication functions and features may be subjected to the typical security and priority fetters.

The invention is embodied in a key telephone system, for providing digital signal communication paths between a plurality of ports and for providing a signalling and supervision link between, any of said ports and a processing device in the key telephone system. The key telephone system includes communication paths being operable to provide n pairs of time division multiplex transmit (TDMT) and time division multiplex receive (TDMR) channels, each channel including a plurality of bit positions. At least one TDMT, TDMR channel pair is exclusively associated with each port. Each said TDMT channel and said TDMR channel includes a signalling and supervision (S and S) bit position, in said plurality of bit positions. A switching means is operable to provide communication paths between ones of the TDMT and TDMR channels, to the exclusion of said S and S bit positions, as directed by the processing device. An interface means, responsive to the processing device, transfers information from the S and S bit position of a selected TDMT channel to the processing device and transfers information from the processing device to the S and S bit position of at least one of the TDMR channels, independently of the communication paths provided by switching means.

A key telephone system, in accordance with the invention, comprises a plurality of ports for connection of any of a station apparatus and an interface apparatus, each apparatus including a processing device for controlling its functions. A synchronous communication medium provides at least one bidirectional communication channel and a message channel at each port. A synchronous switch means transfers information between selected ones of the bidirectional channels in response to control signals. A central processor routinely identifies message channels from which a message from one of said processing devices is receivable, and in response to a received message, at least generates one of the control signals and at least one address for defining a message channel for which a message for a corresponding one of said processing devices is destined. An interface means identifies a request to send, in response to a first predetermined signal characteristic in one of the message channels, previously identified by the central processor, for soliciting and receiving said message. The interface means also transfers destined messages to message channels as directed by the central processor.

The invention is also a method of operating a key telephone system having a central processor and a plurality of station apparatus, each of said station apparatus having a processing device for controlling functions of the station apparatus in response to key control action of a user origin and in response to messages received via the central processor. The method comprising the steps of:

(a) providing at least one bidirectional time division multiplex channel in association with each of the station apparatus;

(b) providing at least one time division multiplex message channel in association with each of the station apparatus;

(c) routinely selecting one of said station apparatus for transmission of a message via its associated message channel; and apparatus.

BRIEF DESCRIPTION OF THE DRAWINGS

An example embodiment is described with reference to the accompanying drawing in which.

DESCRIPTION OF THE EXAMPLE EMBODIMENT

Figure 1:
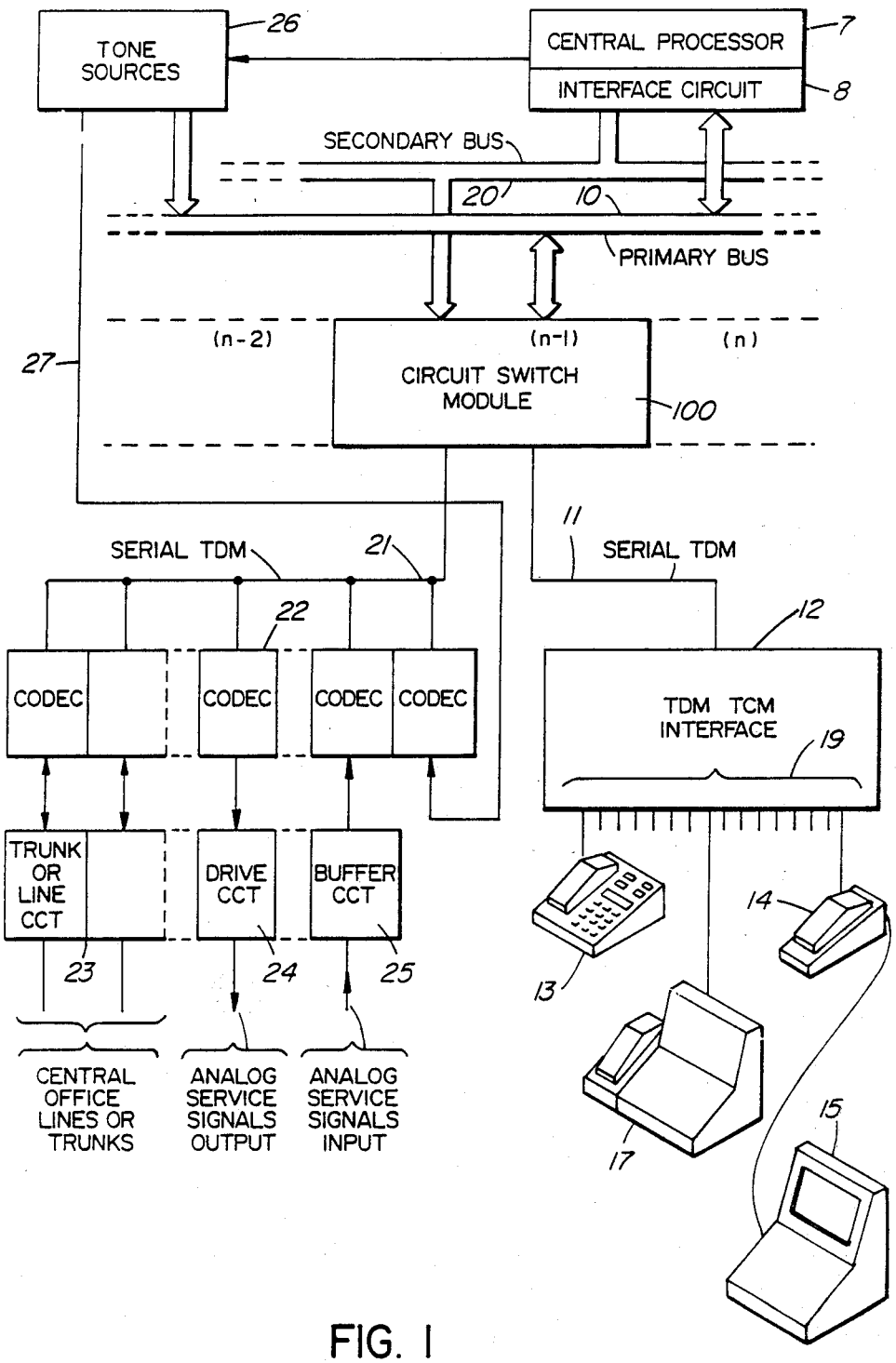
FIG. 1 is a block diagram of a key telephone system in accordance with the invention.

In FIG. 1 a digital key telephone system provides for connection of various digital telephone instruments, as exemplified at 13 and 14, and various digital data terminals, personal computers or the like, as exemplified at 15 and 17, which are able to communicate, via the system, with one another as appropriate, and with other devices via line or trunk circuits 23. The lines and or trunks serve to connect the digital key telephone system with other telephone facilities, for example a central office or private exchange, not shown. A back bone of the digital key telephone system is provided by a short parallel time division multiplex (TDM) bus 10, which provides a wide band communication path between up to nine 64 channel circuit switch modules 100, a central processor interface circuit 8 and tone sources 26. If any of the tone sources 26 provide an analog signal, such is coupled into the system via a lead 27. The bus 10 is referred to as a primary bus, and a secondary bus 20, similar to the primary bus 10, provides for unidirectional communications from the interface circuit 8. Each of the circuit switch modules 100 couples 64 ten bit transmit serial channels to predetermined corresponding time slots in the bus 10, and up to 64 parallel selected TDM time slots on either of the buses 10 or 20 to 64 ten bit receive serial channels. 32 of the serial transmit and receive channels are coupled to an internal ports circuit 12 via a serial TDM path 11. The remaining 32 serial transmit and receive channels are coupled to external port circuits at 22 via a serial TDM path 21. Each of the channels is capable of transmitting a binary signal pulse stream at a rate of 80 kilo bits per second, with at least 64 kilo bits per second being available as a channel for pulse code modulated (PCM) voice information, or data information. The remaining sixteen kilobits may be committed to supervisory and signalling communications, in association with the PCM or data information. In this example the internal ports circuit 12 consists of sixteen TDM time compression multiplex (TCM) interfaces. The TCM method of signal transmission is sometimes referred to as "Ping Pong" transmission. Each of these interfaces provides a transmit path between each of TCM links 19 and two predetermined and fixed serial TDM channels in the serial TDM path 11. In a similar manner analog signals are interfaced to and from various trunk or line circuits shown at 23, 24 and 25, via the serial TDM path 21 and the external ports 22 provided by CODEC circuits. Alternately, it may be advantageous to provide an external TDM port for interfacing with another telephone facility via a digital signal transmission link, T1 or DS30 for example. However in this case, each CODEC circuit interfaces with a predetermined and fixed transmit and receive channel pair of the serial TDM path 21. Hence, for each and every port (that is a place where a digital telephone instrument or other digital device or a digitally interfaced or compatible line, trunk and the like may be connected to the digital key telephone system), there is at least one predetermined ten bit parallel time slot in the primary bus 10 which is allocated to receive information from the line appearance. In an alternate example, the time slots on the bus 10 correspond to line appearances for the purpose of transmitting information thereto. However, such alternate example is not herein further discussed. A central processor 7 is coupled via the interface circuit 8 to the primary bus 10 for communication via a predetermined 32 of the ten bit parallel time slots. The interface circuit 8 may receive all ten bits of each time slot on the bus 10. Normally, only the two bits corresponding to a sixteen kilobit sub-channel are transferred from the bus 10 to the central processor 7 by the interface circuit 8, for purposes of call control. The interface circuit 8 provides signalling and supervision from the central processor 7 via the secondary bus 20 at time slot occurrences corresponding to intended line appearance destinations via the appropriate circuit switch module 100. Therefore each circuit switch module 100 transmits 10 bits to the primary bus 10 but receives and switches only 8 bits from the primary bus 10. The other two bits are received at the appropriate time via the secondary bus 20.

In this example, each port associated communication path provides for full duplex operation with two words of ten bits each being exchanged every 125 micro seconds. In at least one of these words, bit positions 0–7 are dedicated to one of data or voice, the bit position 8 is dedicated to signalling and supervision, and the bit position 9 is dedicated to validation of signalling and supervision. The signalling and supervision information is collected from, and distributed to, the port associated channels via the interface circuit 8 under the direction of the central processor 7. The collected information is gathered into byte groupings by the interface circuit 8 for transfer to the central processor 7 and by a somewhat complimentary function, information is distributed from the central processor 7, via the interface circuit 8 into bit position 8 of a selected one of the channels or of all the channels.

The key telephone system is intended to support two generically different types of station apparatus: one being a very basic telephone station set hereafter referred to as a STIMULUS set or an S set, which includes a bit stream interface device, a simple processing device, and a CODEC; and the other being a more complex featured autonomous station apparatus which may take the form of a proprietary key telephone set, interface apparatus, or proprietary display telephone or data terminal. Such instrument is referred to as a FUNCTIONAL set and such reference is intended to indicate that the apparatus contains some call processing instructions in the form of software or firmware. For convenience, any station apparatus which is not an S set is hereafter referred to as a FUNCTIONAL set or an F set.

In the S set, any change in its operating state, for example ON HOOK to OFF HOOK or a key depression, is communicated to the central processor, via the S set processing device, the bit position 8 and the interface device. This is accomplished in the S set by a continuous (request to send RTS) assertion of "00" in the bit position 8 and 9 of the outgoing channel, until a validated clear to send (CTS) is received in bit positions 8 and 9 of the incoming channel. When the CTS is recognized in the S set a STIMULUS protocol message indicating OFF HOOK is transmitted via the S and S bit positions 8. Thereafter, a typical call progress proceeds by way of exchange of STIMULUS protocol messages.

By way of exemplary contrast in the F set, a request to send (RTS) may be generated after an OFF HOOK is followed by sufficient telephone call dialing information having been keyed in by a telephone user. In this case the processing device and its operational programming perform basic call processing, and in addition to providing dial tone at the appropriate moment, may also generate ring back or busy tone. The F set communicates similar to the S set, using the S and S bit positions 8. After a CTS is received from the central processor the F set transmits a FUNCTIONAL protocol message.

Table 1 illustrates structural arrangements of messages of STIMULUS protocol and FUNCTIONAL protocol.

TABLE 1

| HEADER Binary | (HEX) | TYPE | LENGTH |
|---|---|---|---|
| 0X000000 to 0X011111 | (40 H) to (5 FH) | STIMULUS | 1 BYTE |
| 0X100000 to 0X100111 | (60 H) to (67 H) | STIMULUS | 2 BYTES |
| 0X101000 to 0X101111 | (68 H) to (6 FH) | STIMULUS | MULTI-BYTE |
| 0X110000 to 0X111111 | (70 H) to (7 FH) | FUNCTIONAL | VARIABLE |

In the header, bit positions left to right are 7 through 0. In particular, bit positions 5 and 4 indicate the protocol of the message. FUNCTIONAL messages in this arrangement are indicated by both of the bit positions 5 and 4 being asserted "1". S STIMULUS MESSAGES are indicated by at least one of the bit positions 5 and 4 being asserted "0" The purpose of each of the bit positions in the header as illustrated in Table 2.

TABLE 2

| BIT | 7 | 6 | 5 | 4 | 3 | 2 | 1 | 0 |
|---|---|---|---|---|---|---|---|---|
| PURPOSE | START | | CLEAR TO | PROTOCOL | | SECONDARY INFORMATION | | |

TABLE 2-continued

| BIT | 7 | 6 | 5 | 4 | 3 | 2 | 1 | 0 |
|---|---|---|---|---|---|---|---|---|
| | | | SEND | | | | | |

In the case of a header being in a range of 40H-5FH, the header is the actual message, the gist of which is carried in the bit positions 3-0. In messages of more than one byte, the second and subsequent bytes carry information. The quantity or number of the information bytes within a message are specified in lesser significant bit positions of the header.

The CTS bit position indicates a clear to send message and is only of significance when received by an F set or an S set.

Figure 2:
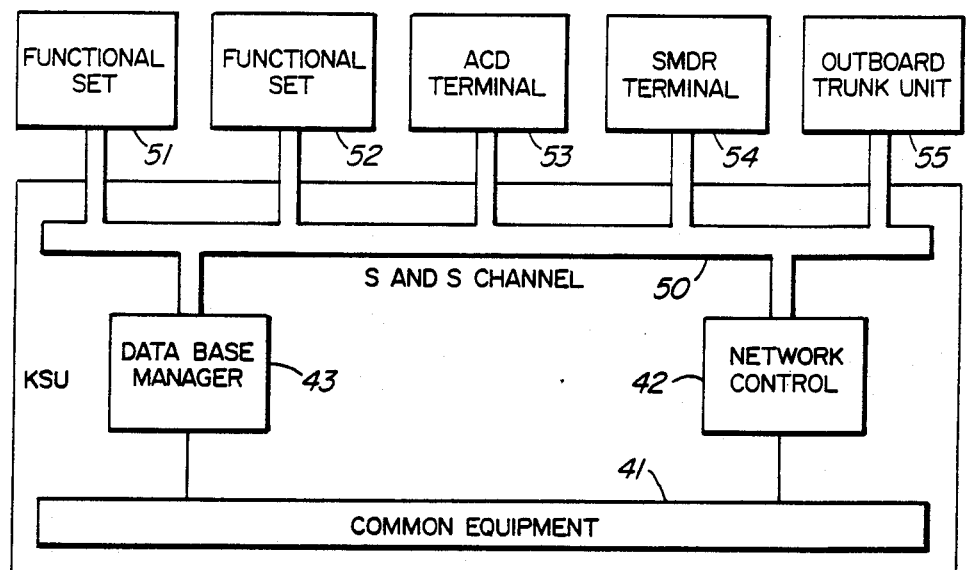
FIG. 2 is a block diagram of a software architecture for supporting FUNCTIONAL station apparatus in the key telephone system in FIG. 1.
Figure 3:
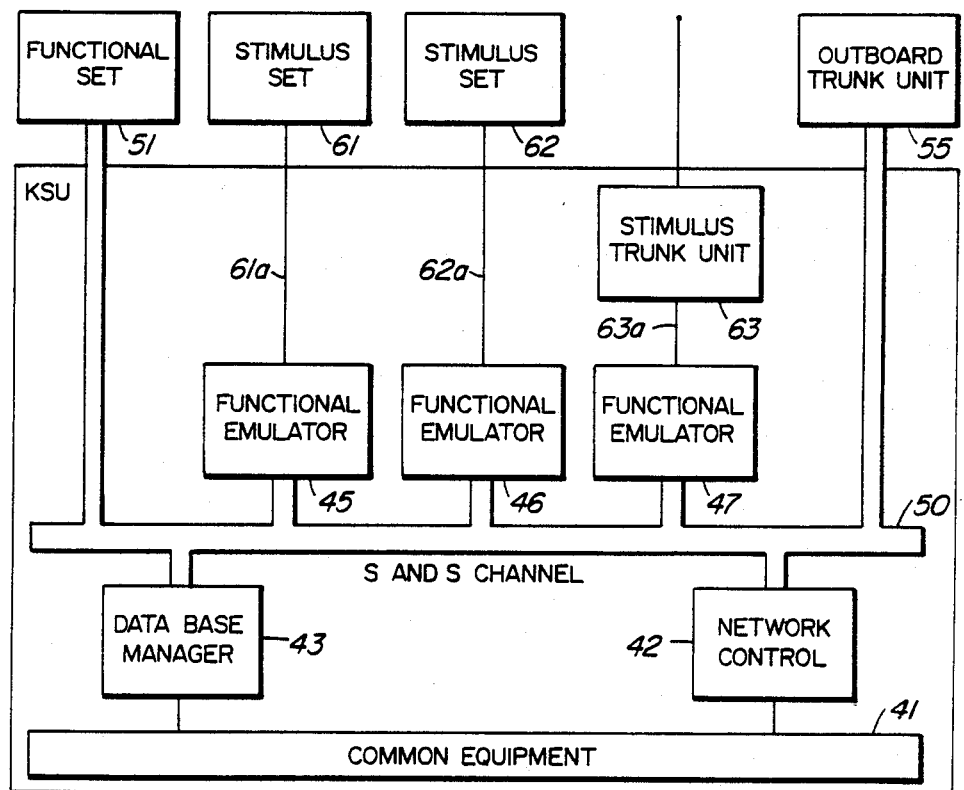
FIG. 3 is a block diagram of a software architecture similar to the software architecture illustrated in FIG. 2, but with an added capability of supporting STIMULUS station apparatus as well as the FUNCTIONAL station apparatus.

Plural protocols and central processor flow control of messages, communicated via the S and S bit positions, permit advantageous software architectures as illustrated in FIGS. 2 and 3, to be resident in a key telephone system as shown in FIG. 1. In FIG. 2, a key system unit (KSU) 40 includes common equipment 41 coupled with an S and S channel 50 via software elements, namely a network controller 42 and a data base manager 43. The common equipment 41 is in effect representative of a hardware interface with the buses 10 and 20 in FIG. 1 but also includes firmware and software resident in the central processor 7. In this example, the central processor 7 is provided by a 68008 microprocessor available from Motorola Corp., of 1303 East Algonquin Road, Roselle, Illinois, 60196, U.S.A. The central processor 7 is arranged to support modularized software elements such as the elements 42 and 43.

The S and S channel is a message channel which is in operational effect common to all the FUNCTION station apparatus of the system. Exemplified are F sets 51 and 52, an automatic call distribution (ACD) terminal 53, a system management data retrieval (SMDR) terminal 54 and an outboard trunk unit 55 for connection to a central office (not shown). Each of these is a FUNCTIONAL apparatus which includes its own processing device and call processing software.

FIG. 3 illustrates an example of an architecture configured similar to FIG. 2, but for supporting STIMULUS sets in addition to FUNCTIONAL sets. In this case, the common equipment 41 also supports additional modular software in the form of FUNCTIONAL emulators 45, 46 and 47. These FUNCTIONAL emulators perform, on behalf of respective STIMULUS sets 61 and 62, and a STIMULUS trunk unit 63, to make these appear to the rest of the key telephone system to also be FUNCTIONAL sets. Hence, in some system configurations, economy on a per port basis is achieved. It should be noted that FUNCTIONAL elements 52-54 may also be present in FIG. 3 but were omitted for convenience of illustration.

In operation of the key telephone systems in accordance with FIGs. 2 or 3, any F set receiving a CTS message is able to transmit to all FUNCTIONAL entities, be these apparatus or emulators. Likewise F emulators are able to transmit to all FUNCTIONAL entities but as the F emulators are software based in the KSU, the previously discussed arbitration ritual of RTS and CTS is not required. Any FUNCTIONAL entity which may thus respond or act in accordance with its own programming as warranted by the content of the transmitted FUNCTIONAL message. Any such FUNCTIONAL message involving a STIMULUS set is intercepted and subsequently acted upon by the corresponding FUNCTIONAL emulator software module. This effectively results in a series of STIMULUS messages being exchanged between the FUNCTIONAL emulator and its associated STIMULUS set via its S and S channel. For example, S set 61 and emulator 45 exchange messages via an S and S channel 61a.

In FUNCTIONAL messaging the message bits are distributed or relayed to every channel occurrence in each frame. Although STIMULUS sets or units are thus exposed to the FUNCTIONAL messages, the STIMULUS processor devices therein are arranged to disregard FUNCTIONAL messages as recognized by the distinct header as illustrated in the foregoing tables 1 and 2. On the other hand, STIMULUS messages are unidirectional. Distribution of a STIMULUS message is confined to the channel occurrence which corresponds to a STIMULUS set for which the STIMULUS message is destined.

Flow control of FUNCTIONAL and STIMULU messages is discussed from a hardware viewpoint after the following discussion of the structure and operation of the modular circuit switch module 100 with reference to FIGS. 4-10.

Figure 4:
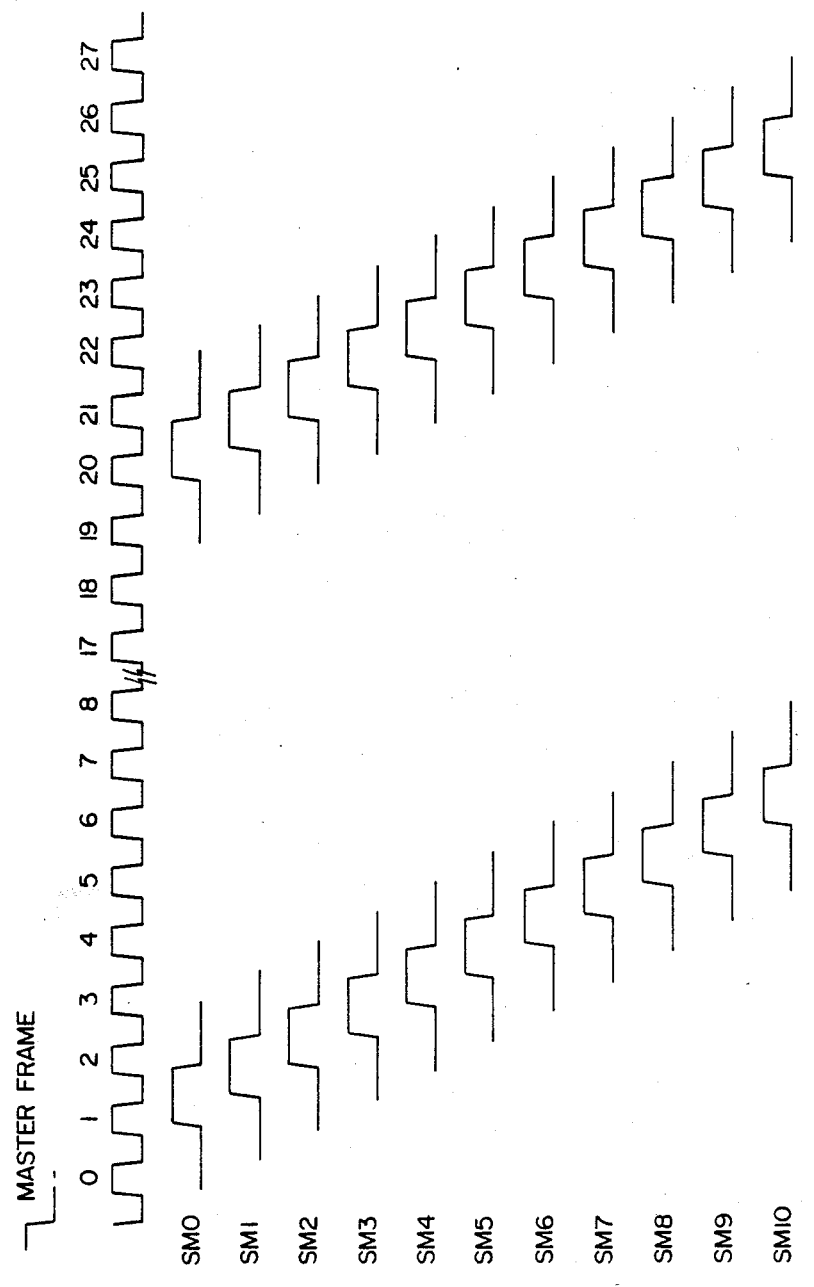
FIG. 4 is a graphical illustration of operating timing pulses and or signals generated within a circuit switch module used in FIG. 1.
Figure 5:
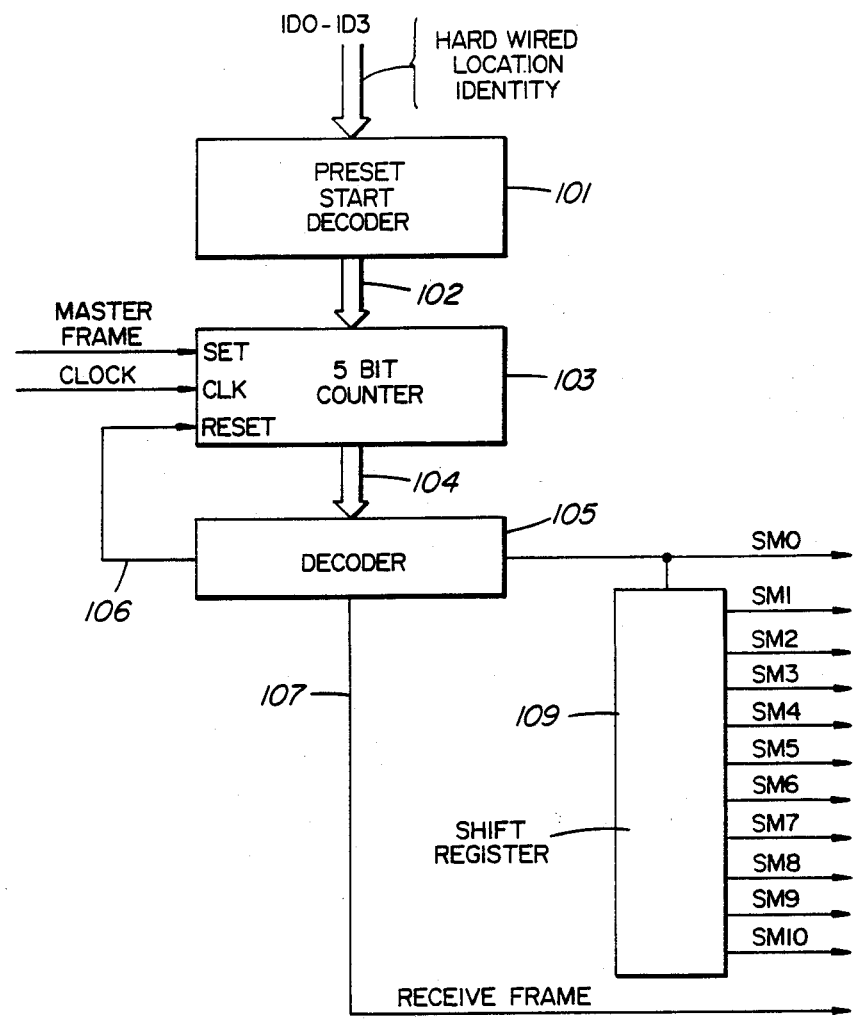
FIG. 5 is a block diagram of a timing sequence generator used in the circuit switch module for providing the timing signals illustrated in FIG. 4.

In order that each of one or more circuit switch modules 100 be able to transfer information from the serial TDM paths 11 and 21 to the parallel TDM bus 10 without contention, a phased timing sequencer, as shown in FIG. 5, resides within each of the modules 100 for regulating the functions of the module. Wave forms exemplified in FIG. 4 illustrate a master frame timing pulse occurring at a rate of 1 Khz, clock pulses numbered 0-27 occurring at a rate of 5.12 Mhz and state machine timing pulses SM0-SM10. With the switch module 100 installed in the system, a preset start decoder 101 is connected to a hard wired location, not shown, which provides an identity, that is a fixed four bit binary word, ID0-ID3. The combination of the signal states of the bits ID0-ID3 is unique for each possible switch module location in the digital key telephone system. The preset start decoder 101 generates a 5 bit binary word on a bus 102, in response to the combination of bit states as shown in table 1. A five bit counter 103 is preset by each occurrence of the master frame pulse, to correspond to the word on the bus 102 and thereafter is incremented with each occurrence of a clock pulse. An output 104 of the counter 103 is decoded by a decoder 105 which generates a reset signal on a lead 106 with each occurrence of a count of 19 in the counter 103. Thus with the occurrence of the next clock pulse, the counter 103 is reset to a count of zero. Thus a modulo 20 counting function is provided, which is phased as is illustrated in table 1.

TABLE 3

| CIRCUIT SWITCH MODULE | ID3 | ID2 | ID1 | ID0 | PRESET VALUE OF BUS 102 | TDM-11 FRAME AND TIME SLOT CORRESPONDENCE | TDM-21 FRAME AND TIME SLOT CORRESPONDENCE |
|---|---|---|---|---|---|---|---|
| 0 | 0 | 0 | 0 | 0 | 18 | 0 | 2 |
| 1 | 0 | 0 | 0 | 1 | 17 | 1 | 3 |
| 2 | 0 | 0 | 1 | 0 | 14 | 4 | 6 |

TABLE 3-continued

| CIRCUIT SWITCH MODULE | ID3 | ID2 | ID1 | ID0 | PRESET VALUE OF BUS 102 | TDM-11 FRAME AND TIME SLOT CORRESPONDENCE | TDM-21 FRAME AND TIME SLOT CORRESPONDENCE |
|---|---|---|---|---|---|---|---|
| 3 | 0 | 0 | 1 | 1 | 13 | 5 | 7 |
| 4 | 0 | 1 | 0 | 0 | 10 | 8 | 10 |
| 5 | 0 | 1 | 0 | 1 | 9 | 9 | 11 |
| 6 | 0 | 1 | 1 | 0 | 6 | 12 | 14 |
| 7 | 0 | 1 | 1 | 1 | 5 | 13 | 15 |
| 8 | 1 | 0 | 0 | 0 | 2 | 16 | 18 |

In accordance with the table, for example for the circuit switch module 0, the channel zero on the serial TDM path 11 is inserted onto the parallel TDM bus 10 in time slot zero, channel one in time slot 20 and so on until the last channel, channel 31, of a serial TDM frame is inserted into time slot 620.

Stated in other terms, each TDM path has 32 parallel ten bit receiving channels assigned to it on the primary bus 10, and each of these channels is separated from the other by 19 other channel occurrences.

The decoder 105 also generates an SM0 timing pulse, coincident with the count of 19 occurring in the counter 103. A shift register 109 responds to the SM0 timing pulse and the clock pulses to generate additional timing pulses SM1-SM10 as illustrated in FIG. 4.

Figure 6:
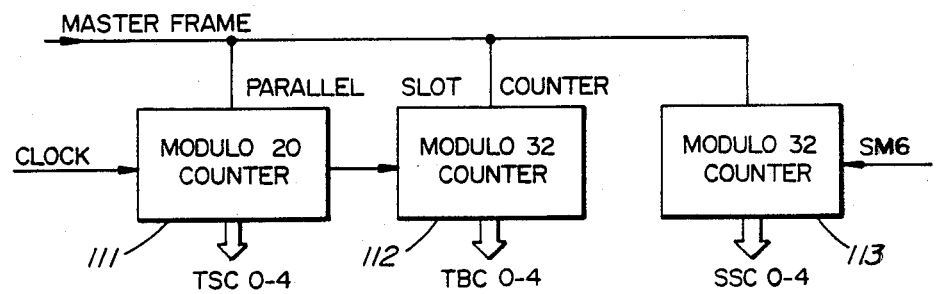
FIG. 6 is a block schematic diagram of counters, used in a circuit switch module in FIG. 1, and arranged to provide time slot and channel addresses for operation of the circuit switch module.

Referring to FIG. 6, the time slot occurrences on the parallel TDM bus 10 are tracked by a parallel slot counter which includes a modulo 20 counter 111 and a modulo 32 counter 112. The counter 111 responds to the 5.12 MHz clock pulses to provide repetitive counts of 0 through 19 on five time slot count leads TSC 0-4. The counter 112 is incremented with each reset occurrence in the counter 111 to provide repetitive counts of 0 through 31 on five time block count leads TBC 0-4, whereby in combination binary signals on the TSC and TBC leads define 640 parallel time slot addresses per frame. A serial channel counter function is provided by a counter 113 which provides 32 channel counter addresses on serial channel count leads SCC 0-4 to define channel occurrences in the serial TDM paths 11 and 21. The counter 113 is incremented with each time block occurrence as indicated by the timing pulse SM6. All of the counters 111, 112 and 113 are reset with each occurrence of the master frame pulse.

Figure 7:
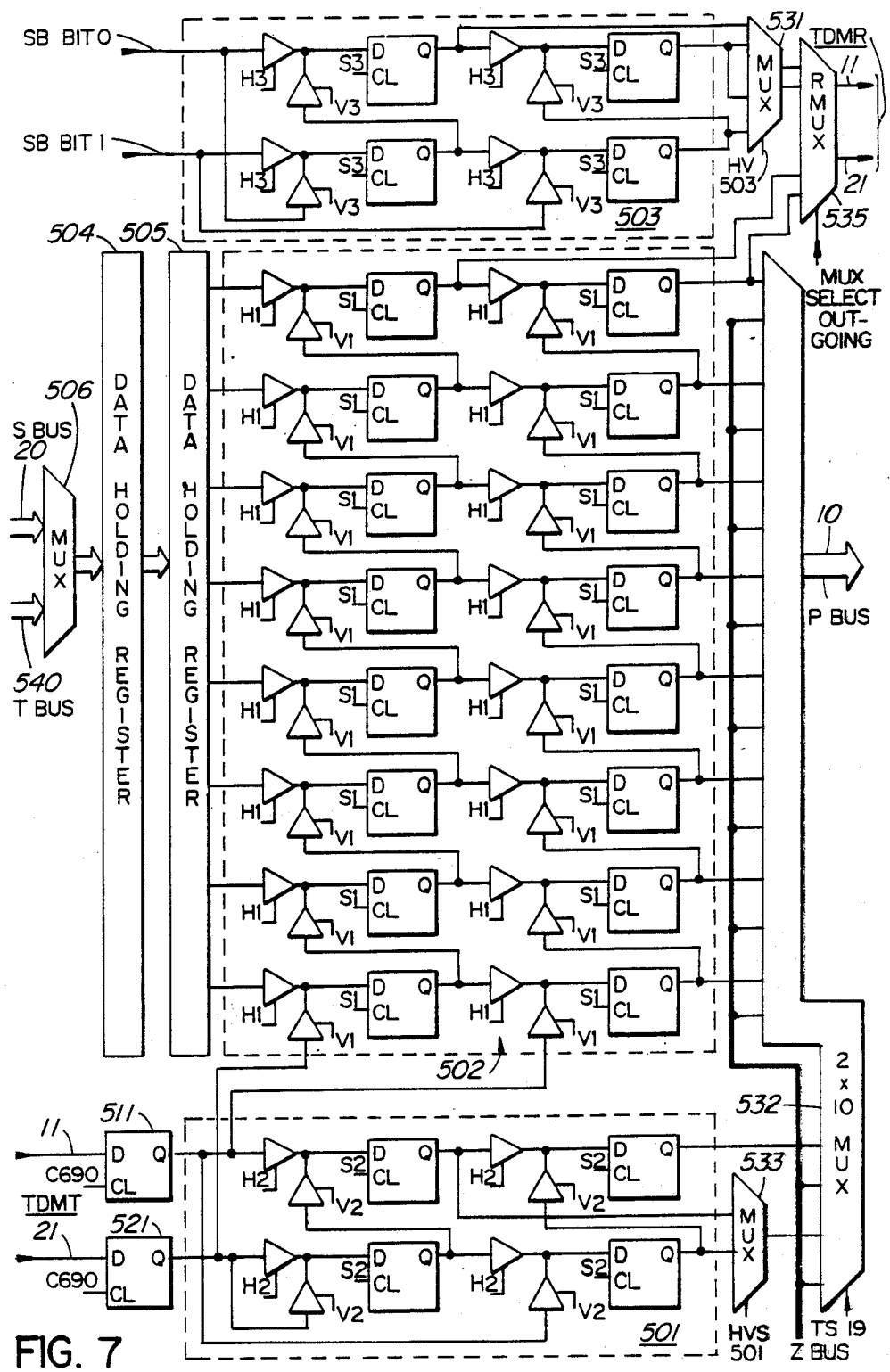
FIG. 7 is a block schematic diagram of a converter circuit used in the circuit switch module in FIG. 1.

The converter circuit illustrated in FIG. 7 resides within the circuit switch module 100 and performs both serial to parallel conversions and parallel to serial conversions for each of the 64 TDMT and the 64 TDMR channels on the TDM paths 11 and 21. As before mentioned, the TDMT channels are incoming and carry data or voice, plus signalling bits originating at the terminal instruments, while the corresponding TDMR channels are outgoing, each to the originating terminal instrument. Each incoming time slot includes 10 binary bits which are converted directly to parallel form and asserted during the predetermined time slot interval on the primary bus 10. Each outgoing time slot includes 10 binary bits which are obtained from one of two sources: one source being a corresponding time slot interval on the secondary bus 20; the other source being 8 bits from any time slot interval on the primary bus 10, the 8 bits having traversed the time switch, plus 2 bits from the time slot interval on the secondary bus 20 corresponding to the TDMR channel occurrence.

Figure 8:
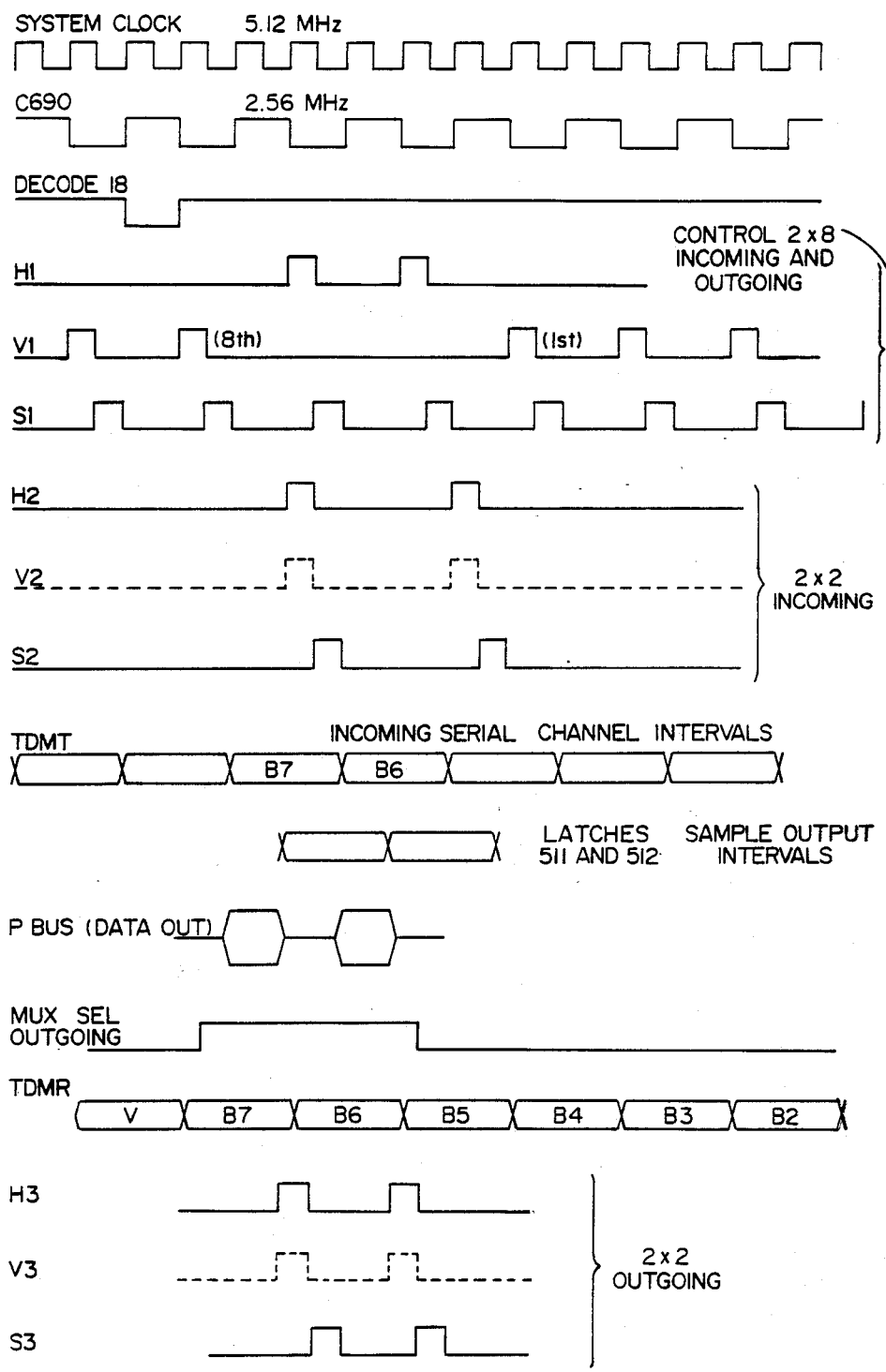
FIG. 8 is a graphical illustration of various timing signals used in the operation of the converter circuit in FIG. 7.

The converter circuit is discussed in more detail with reference to the timing signals illustrated in FIG. 8. A SYSTEM CLOCK waveform shown at the top of FIG. 8, and some of the other waveforms in FIG. 8 are idealistically depicted for convenience as having vertical rise and fall portions. Actually, in practice these waveforms have sloped rise and fall portions similar to those waveforms illustrated in FIG. 4, which are more realistically depicted. The converter circuit in FIG. 7 includes three orthogonal shift registers shown at 501, 502 and 503 respectively. These threee registrs perform the required serial to parallel, and parallel to serial conversions. Each of the orthogonal shift registers 501, 502 and 503 is associated with a clock generator, not shown, which produces non-overlapping timing signals, illustrated in FIG. 8, for shifting and directional control. Vertical directional control signals V1, V2 and V3 are used to vertically direct shift functions of the register 502, 501 and 503 respectively, Horizontal directional control signals H1, H2 and H3 are used to horizontally direct shift functions of the registers 502, 501 and 503. The actual loading of D type flip flop elements in the registers 502, 501 and 503 is clocked by signal pulses S1, S2 and S3. The control signal V2 and V3 are shown in broken line to indicate that these signal pulses are 20 system clock periods removed from the adjacent H2 and H3 signal pulses, such that each commences at 40 system clock intervals. Bits of the TDMR serial bit streams are timed to be coincident with the rising edges of a serial digital loop clock signal C690. Bits of the TDMT serial bit streams on the paths 11 and 21 are sampled and re-timed to likewise be co-incident, by latches 511 and 521. A half cycle of the system clock prior to the rising edge of the serial digital loop clock signal C690, contents of the (2 by 8) outgoing register 502 are selected by a receive multiplexer 535 to provide the first bits of each of the TDMR channels at 11 and 21. The receive multiplexor selection is in response to a MUX SEL OUTGOING control signal shown in FIG. 6. The outgoing bits are timed by the rising edge of the clock signal C690 to start transmission of a 10 bit time slot. Shortly thereafter, the starting bits of the corresponding TDMT channels are sampled by the latches 511 and 521 using the falling edge of the same clock signal C690. The sampled bits are then applied to the (2 by 2) incoming register 501. During the said same clock signal C690, contents of the register 502 and the incoming register 501 are asserted in parallel by a multiplexor 532 on the leads of the primary bus 10. Only in an instance of a time slot (TS) 19 occurrence, which is indicated by a rising edge of a decode 18, in FIG. 6, will the multiplexor 532 gate Z bus signal states to the P bus 10. A half cycle of the same system clock signal after the falling edge of the said same C690 clock signal, the three orthogonal registers 501, 502 and 503 are clocked, resulting in the incoming register 501 accepting said starting bits, the outgoing register 503 moving the second outgoing bit to the multiplexor 535, and the register 502 moving 8 bits of the TDMT path 21 toward the multiplexor 532. At the same time the incoming register 501 moves the remaining two bits toward the multiplexor 532 via a multiplexor 533. The next two outgoing parallel information bytes are moved through data holding registers 504 and 505, under control of timing signals SM2 and SM6 and hence, into the register 502. At the same moment, as before described, the register 501 stores the first two bits of each incoming TDMT channel. Once the first two bits have occurred, the registers 501 and 503 receive no further clock signals until the start of the next outgoing time slot sequence when all 10 registered bits are shifted in parallel toward the P bus 10.

At the start of the next time slot sequence, registers 501 and 503 are caused to move their respective contents (2 bits) vertically, that is upwardly in FIG. 5. Thereafter the next eight TDMT bits are shifted vertically into the register 502 and the previous contents are likewise shifted out to be transmitted via the multiplexor 535 and the TDMR paths 11 and 21. The horizontal directional control signals and the vertical directional control signals continue to be alternately asserted thereby repeating the parallel to the serial and serial to parallel cycle for each TDM channel on TDM paths 11 and 21.

Figure 9:
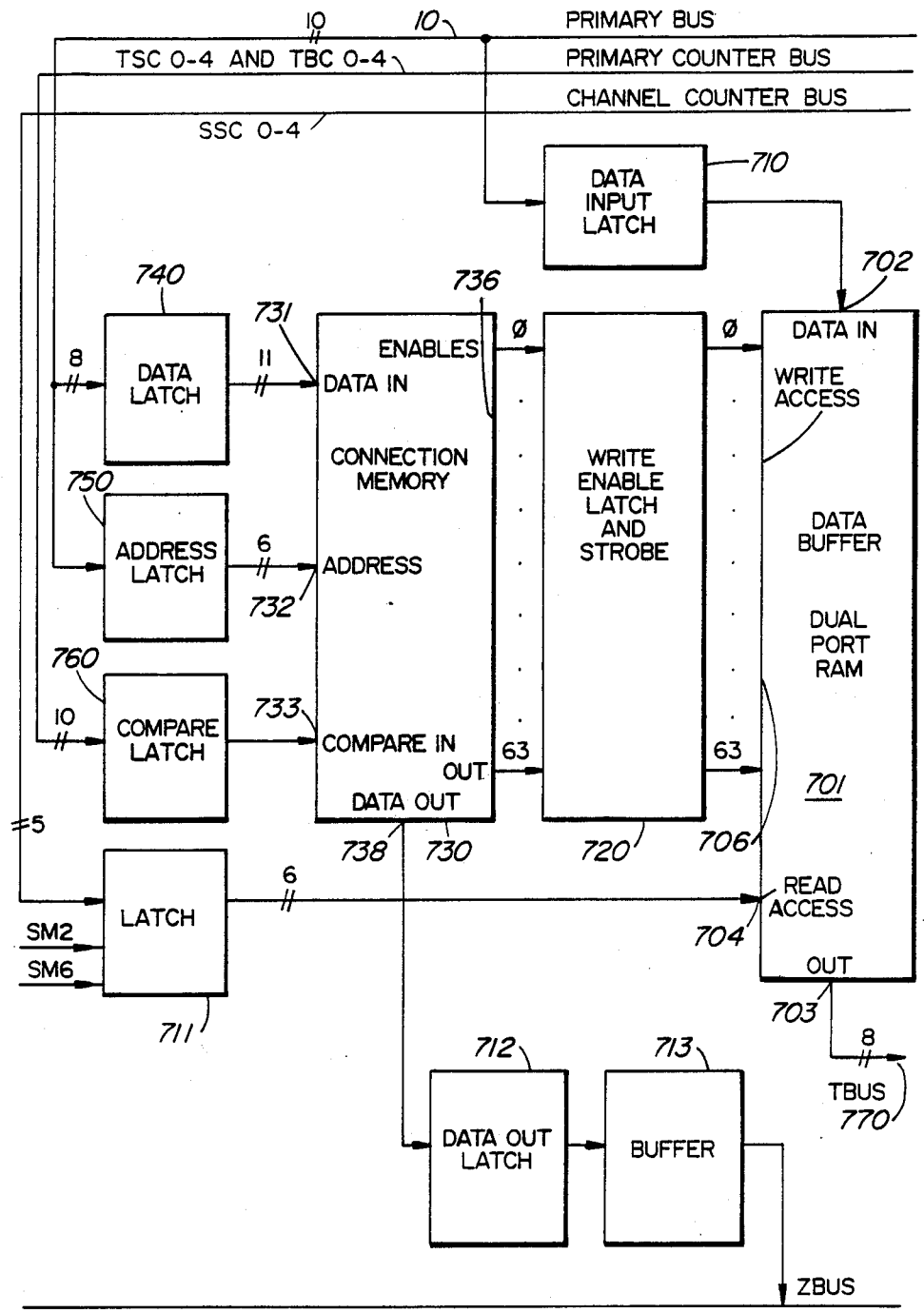
FIG. 9 is a block schematic diagram of a time switch circuit used in the circuit switch module in FIG. 1 to provide circuit switched communication paths in the key telephone system.

The time switch circuit in FIG. 9 provides for a timely transfer of 8 information bits from one of the 640 time slots on the primary bus 10 to a parallel T bus input of the parallel input multiplexor 506 of the converter circuit in FIG. 7, and thereby ultimately to a TDM path (11 or 21) time slot, as directed by the central processor 7. The information bits of each time slot on the P bus 10 are momentarily captured by a data input latch circuit 710 and thereafter applied at an input 702 of a dual port random access memory (RAM) 701. The dual port RAM 701 includes an output 703 which drives a T bus 770 in response to a six bit address applied at a read access address port 704. The RAM 701 differs from a typical dual port memory device in that for the purpose of storing information received at its input 702, it does not include the typical address decode circuitry. Instead, each write address is decoded and applied to an individual one of 64 write enable leads at 706. The decoded write address is timed via a write enable latch and strobe circuit 720. Any number of the write enable leads may be asserted by the circuit 720 simultaneously. The dual port RAM 701 responds, to a signal assertion or signal assertions on any or all of its 64 write enable leads at 706, by storing the signal states of said 8 information bits at the corresponding memory location or locations as the case may be. For example, if none of the leads at 706 is asserted, no storage locations are written. If one or more of the leads at 706 is asserted, the one or more corresponding storage locations are written. Reading of the 64 dual port RAM storage location occurs sequentially on a regular and periodic basis, under the control of a flip flop, not shown, in the latch 711 which is toggled by signals SM2 and SM6, and the 32 sequentially generated TDM channel addresses which are generated by the counter 113 in FIG. 6.

A connection memory 730 contains information as to the actual time slots of the 640 P bus 10 time slots from whence information bit states are stored in the dual port RAM 701. The connection memory 730 is provided by a content addressable memory which includes an eleven bit data input port 731, a six bit address port 732 and a 10 bit compare address port 733. The general structure and operation of content addressable memories is known. In this example P bus addresses, from whence information is to be stored, are lodged in memory locations in the connection memory 730. Each of 64 memory locations, not shown, correspond with a separate one of 64 output leads at 736. A digital comparitor, not shown, is associated with each of the 64 memory locations such that addresses appearing at the compare port 733 are each compared with the information stored at each of the 64 memory locations. In every instant where the address at the compare port 733 and the information at a memory location is the same and the memory location also includes an asserted validity bit, the corresponding one of the 64 output leads at 736 is asserted. The asserted state is eventually transferred via the circuit 720 to the dual port RAM 701, which responds as previously described.

Operation of the circuit switch modules 100 is directed by the central processor 7, which uses the interface circuit 8 and 32 dedicated time slots on the P bus 10 for lodging information into the memory locations of the connection memory 730 via a data latch circuit 740 and an address latch circuit 750. The information is delivered from the interface circuit 8 in the form of four bytes each of which occupies time slot 19 of 4 sequentially occurring time blocks on the P bus 10. The four bytes include a command byte, followed by an address byte, a low order data byte, and a higher order data byte. Each of these bytes is asserted along with a validity signal on one of the two remaining leads of the P bus 10 which indicates that the bytes are in fact an instruction from the central processor 7. A portion of the command byte specifies either a write or a read function intended for one of a connection memory, a source connection memory or a destination connection memory. A comparitor responds to the validity signal and a match between a remaining portion of the command byte and the IDO-3 by causing the address latch to store the next byte, that is the address byte. Thereafter the data latch 740, in FIG. 9, captures 11 bit states of the low and higher order bytes, which are subsequently stored in the memory location of the connection memory 730 as indicated by six address bits asserted by the address latch 750. Provision is also made for the central processor 7 to confirm the information content of any address in the connection memory. In this case the command byte indicates the read function, and the address byte indicates the memory location to be read. The subsequent low and higher order bytes are driven by the stored information from a data output 738 of the connection memory 730 and via an output latch 712 and buffer 713 to the Z bus and thence via the multiplexor 532 in FIG. 7 onto the P bus 10 where it is picked up by the interface circuit 8.

Figure 10:
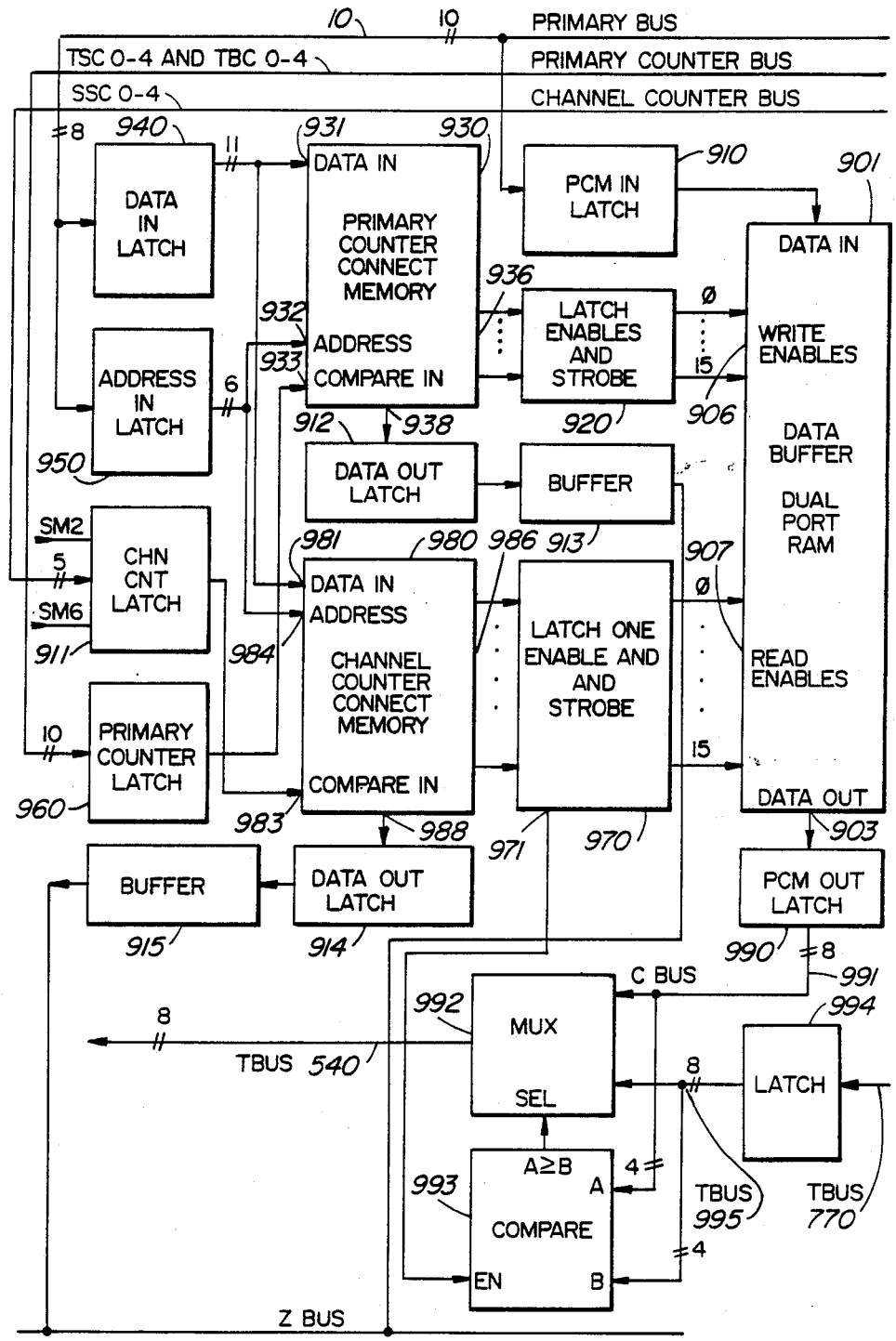
FIG. 10 is a block schematic diagram of a time switch conference circuit in the circuit switch module and used in combination with the time switch circuit of FIG. 9 to provide a conference feature in the key telephone system.

The time switch conference circuit in FIG. 10 provides a three party conference feature in the digital key telephone system. The time switch conference circuit adds an ability for a timely transfer of 8 information bits from another of the 640 time slots on the P bus 10, ultimately to, for example, said TDM path time slot previously referred to at the beginning of the discussion of FIG. 9. Very briefly by way of introduction, bytes are presented to a multiplexor 992 in FIG. 10 via the T buses 770 output from FIG. 9 and via a conference C bus 991. The four most significant bit (not including the sign bits) of each byte are compared in a comparitor 993 which directs the multiplexor 992 to assert the 8 bits from the C bus 991 on the T bus 540 in the event that the value of the 4 bits from the C bus 991 is equal or greater than a value of the 4 bits from the T bus 995. In the event the T bus 995 value is greater, then the 8 bits from the T bus 995 are asserted on the T bus 540 by the multiplexor 992. Thus a three party conference call may be implemented wherein each party hears only the instant loudest speaking party of the other two parties.

Considering the time switch conference circuit of FIG. 10 in more detail, the information bits of each time slot on the P bus 10 are momentarily captured by a PCM input latch 910 and thereafter applied at an input 902 of a dual port RAM 901. The dual port RAM 901 includes an output 903 which is buffered to the C bus 991 via a PCM output latch circuit 990. Likewise the T bus 770 is buffered to the T bus 995 via a latch circuit 994. The dual port RAM 901 differs from the dual port RAM 701 in that it has only 16 memory locations and lacks typical address decode circuitry for the purpose of reading out information stored at these memory locations. Each write address is decoded and applied to an individual one of 16 write enable leads at 906 and likewise each read address is decoded and applied at an individual one of 16 read enable leads at 907. The decoded write address is timed via a write enable latch and strobe circuit 920. Likewise the decoded read address is timed via a read enable latch and strobe circuit 970. The read enable latch and strobe circuit 970 also includes an EXCLUSIVE OR logic circuit not shown, which responds to a single decoded read address occurrence by asserting a compare enable signal on a lead 971. The compare enable signal is used to activate the selection function of the comparitor circuit 993, which in the absence of the compare enable signal causes the multiplexor 992 to assert the T bus 995 bit states onto the T bus 540, exclusively. Hence if no decoded read address or more than one decoded read address is asserted at inputs of the read enable latch and strobe circuit 970, the conference function does not occur. The dual port RAM 901 responds to a signal assertion on a write enable lead at 906, by storing the signal states of said 8 information bits at the corresponding memory location. Likewise, reading of a memory location in the dual port RAM 901 occurs in response to a corresponding read enable lead at 907 being asserted.

A source connection memory 930 contains information as to the actual P bus time slots from whence information bit states are stored in the dual port RAM 901. The source connection memory 930 is provided by a content addressable memory having 16 memory locations, not shown, each corresponding to a separate one of 16 output leads at 936. The source connection memory 930 includes an eleven bit data port 931, a six bit address port 932 and a ten bit compare address port 933. A digital comparator, not shown, is associated with each of the 16 memory locations such that addresses appearing at the compare port 933 are each compared with the information stored at each of the 16 memory locations. In an instant where the address at the compare port 933 and the information at a memory location are the same and the memory location also includes an asserted validity bit, the corresponding one of the 16 output leads at 936 is asserted. The asserted state represents a decoded write address, which is subsequently transferred via the circuit 920 to the dual port RAM 901 which responds as previously described.

A destination connection memory 980 contains information as to the actual TDMR time slots on the TDM paths 11 and 21 to which information bit states stored in the dual port RAM 901 may be directed via the multiplexor 992 and the T bus 540. The destination connection memory 980 is of a structure similar to that of the previously described source connection memory 930. Addresses appearing at a compare port 983 are each compared with information stored at each of 16 memory locations. In an instant where the information at the compare port 983 and the information at a memory location are the same and the memory location also includes an asserted validity bit, a corresponding one of 16 output leads at 986 is asserted. The EXCLUSIVE OR logic circuit in the read enable latch and strobe circuit 970 permits the corresponding read enable lead at 907 to be asserted, which causes the dual port RAM 901 to read out the 8 information bit states from the corresponding memory location as previously described.

The information appearing at the compare port 983 is asserted from the channel counter bus leads SSC 0–4 by a channel counter latch circuit 911. The latch circuit 911 also includes a flip flop, not shown, which is toggled by the timing signals SM2 and SM6 and thereby provides 64 addresses per frame, similar to that previously discussed in relation to the latch circuit 711.

Operation of the conference function in the digital key telephone system is directed by the central processor 7, which uses the interface circuit 8 to communicate with the 32 dedicated time slots on the P bus 10 for lodging information into the memory location of the source connection memory 930 and the destination connection memory 980 via a data latch circuit 940 and an address latch 950 in a manner similar to that previously discussed in relation to the connection memory 730. Likewise the central processor 7 may confirm the information content of the source connection memory 930 by way of a data output 938, a data output latch circuit 912, a buffer circuit 913 and the Z bus, connected as shown in FIG. 8. Information content of the destination connection memory is also available to the central processor 7 by way of a data output 988, a data output latch circuit 914, a buffer circuit 915, and the Z bus, connected as shown in FIG. 10.

Figure 11:
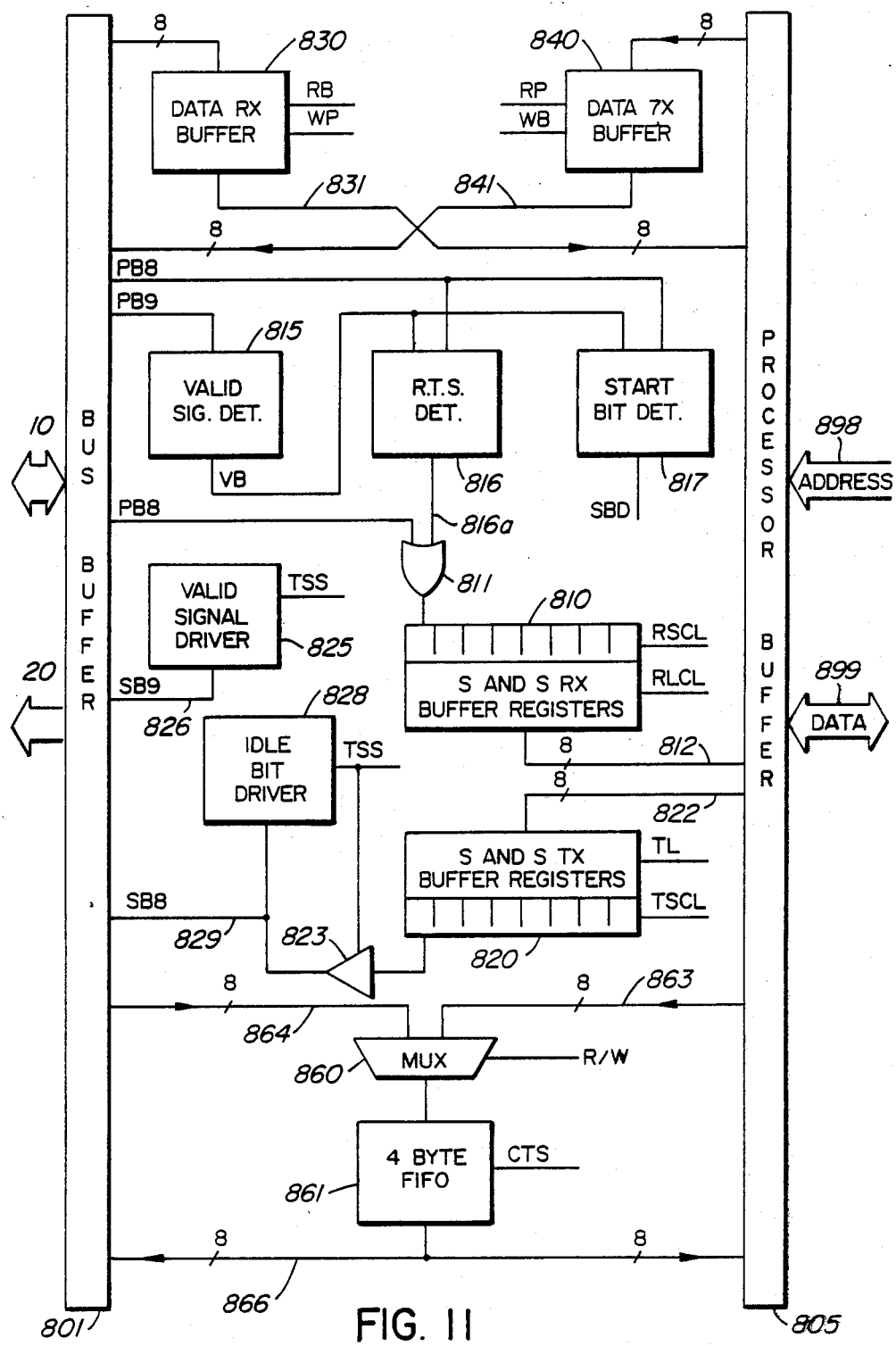
FIG. 11 is a block schematic diagram of an interface circuit used in the key telephone system illustrated in FIG. 1
Figure 12:
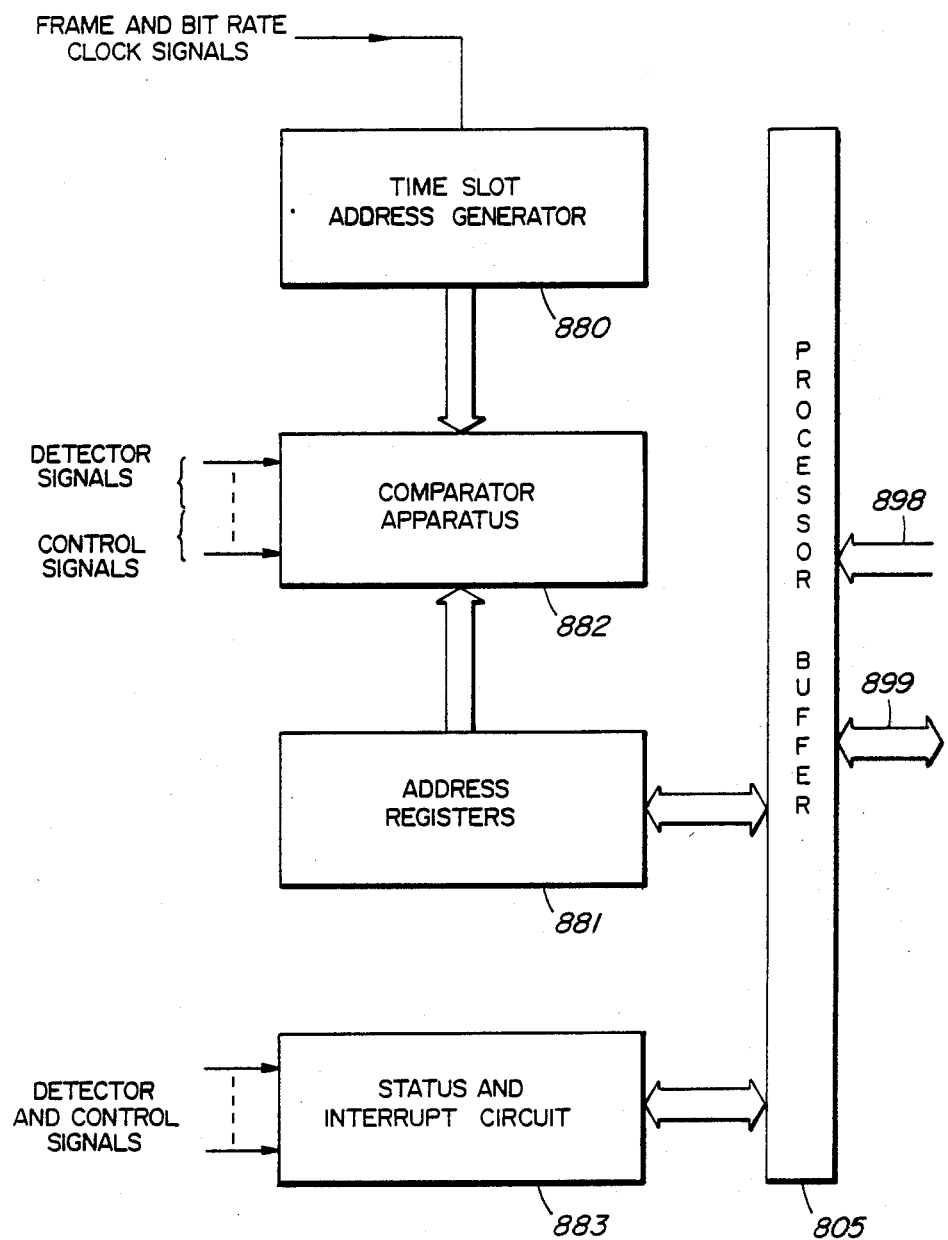
FIG. 12 is a block schematic diagram of a processor interface circuit used in the key telephone system illustrated in FIG. 1.

A primary function of the interface circuit 7, as illustrated in FIGS. 11 and 12, is that of receiving S and S messages and distributing S and S messages. The S and S messages are received from the primary bus 10 in one port related time slot at any one time by S and S receive buffer registers 810. The S and S messages are transmitted to all of the secondary bus 20 time slots or to a selected one of the secondary bus 20 time slots by S and S transmit buffer registers 820. The S and S messages are physically coupled with the primary and secondary buses 10 and 20 by a bus buffer circuit 801. The interface circuit is similarly coupled to central processor address and data buses, at 898 and 899, by a processor buffer 805. A primary function of the buffers 801 and 805 is that of relaying signals between all of various potential signal sources and destinations while minimizing the actual number of receiving gates and driving gates physically attached to the buses and various unillustrated timing and control leads. Provision of such buffers is usual in digital electronic systems and does not warrant detailed discussion.

Another primary function of the interface circuit is that of capturing requests to send (RTS) an S and S message. As before described, an RTS occurrence is marked by 'zero' occurrences in bit positions 8 and 9 in a time slot. A valid signal detector receives each bit 9 time slot state and detects and latches the 'one' state for a short time. A request to send detector 816 likewise receives each bit 8 time slot state. If the valid signal detector 815 is unlatched and the bit 8 state is 'zero', the RTS detector 816 asserts a request to send signal indication on an RTS lead 816a. If the request to send is from within a selected group of time slots, a receive shift clock (RSCL) causes a shift register portion of the buffer registers 810 to shift the RTS indication into the buffer register 818. After sixteen RSCL pulses, a receive load clock (RLCL) causes the contents of an intermediate two byte shift register to be transferred to a two byte output register. The contents of the output byte register are available at the processor buffer 805 via an S and S message bus 812. Thus the registers 818 are clocked to monitor a group of 16 specified ports in the key telephone system for RTS occurrences. An occurrence of an RTS during any input from any of the 16 specified ports is arranged to generate a low level interrupt to alert the central processor to the presence of information. However, as it is intended that each port connected apparatus will continuously RTS until a clear to send (CTS) is received by it, there is no particular urgency attached to any one RTS occurrence. Eventually, the central processor will specify transmittal of an appropriate CTS and simultaneously select the port related time slot as a source of an expected S and S message.

When a CTS message is detected in the intended station apparatus a response, in the form of at least a one byte message, is transmitted. The first bit of the message is a 'one' in the bit 8 position and a valid 'one' in the bit 9 position. This combination causes a start bit detector 817 to raise a start bit (SB) signal for the duration of subsequent uninterrupted valid signal detection occurrences, coincident with the selected time slot. In the presence of the SB signal, RSCL pulses (one per frame) cause bit 8 states of the selected time slots to be shifted into the S and S receive buffer registers 810. Interrupt signals are generated with every byte so collected, such that the central processor is able to receive and if necessary, internally ensue the incoming S and S message.

Outgoing S and S messages are received from the processor buffer 805 via a bus 822 as timed by transmit load (TL) pulses. A shift register in the register 820 shifts received bytes, bit by bit toward the bus driver 801 at a rate of one bit per frame in response to transmit shift clock (TSCL) pulses. The state of the output stage of the shift register is continuously applied to a transmission gate 823. The transmission gate 823, and an idle bit driver are both responsive to a time slot select (TSS) signal for this operation. In the case of an F message, the TSS is asserted throughout the length of the message continuously, frame after frame. In the case of an S message, the TSS is asserted for the duration of the time slot associated with the destination port of the S message. The idle bit driver asserts a 'one' on the lead 829 when the TSS is not asserted. A valid signal driver 825, responds to the TSS assertion by asserting a 'one' on a lead 826, whereby S and S bit assertion on the lead 829 are accompanied by valid signal bit assertion on the lead 826.

Another capability of the interface circuit 8 is that of providing wide band data paths between any of the port associated 64 Kbs channels and the central processor 7. Input is received from any specified channel via a data receive buffer 830 under the control of a read bus (RB) strobe, which is generated coincident with occurrence of a primary bus time slot from which receiving is required. This occurrence preferably raises a high level interrupt which is intended to result in a write to processor (WP) strobe being generated to provide the buffered byte on a bus 831 for use by the central processor 7. In like manner, bytes of information are transferred from the central processor 7, via a data transmit buffer 840 to a bus 841, for assertion during a predetermined time slot on the primary bus 10.

Although the buffers 830 and 840 provide a convenient data transport interface, this type of interface can be unduly time consuming if such transfers are to occur frequently. For example, frequent data transfers are required between the switch modules 100 and the central processor 7, in order to exercise prompt control of communication paths in the key telephone system. Hence, a more specialized interface is provided which operates throughout the 32 time slots on the primary bus 10, which are dedicated to exclusive use by the central processor 7, as previously described. Connection instruction bytes are loaded from a bus 863 to a four byte FIFO 861 via a multiplexor 860 in the presence of a write (W) signal. After the FIFO 861 has received four bytes, the central processor 7 must direct the interface circuit to initiate transfer of data to the circuit switch 100 via a bus 866 and the primary bus 10. The interface circuit asserts the bits states appearing at the FIFO output onto the primary bus 10 with each occurrence of a dedicated control time slot. If no information transfer is required, an idle code is asserted on the bus 863 and therefore is subsequently asserted on the bus 866. By this means, up to 32 bytes of connection instruction can be transferred via the primary bus during each frame. Up to 16 bytes of query and 16 bytes of response information may be exchanged via the primary bus 10 by loading the FIFO with a two byte query message.

Functional circuit blocks in FIG. 12 interface with the central processor 7 via the same processor buffer 805, shown in FIG. 11. In FIG. 12, a time slot address generator 880 similar to that discussed in relation to FIG. 5 provides definition of time slot interval occurrences on the primary and secondary buses for the interface circuit 8. Particularly, address registers 881 are selectively loaded via the buffer 805 from the central processor 7 to define; those time slots which are watched for RTS, that time slot which is granted S and S message transmission to S and S receive buffer registers 810; and the time slot selected for single channel transmission of an S and S STIMULUS message or a CTS message.

In operation, a comparator apparatus 882 monitors the contents of the address registers 881 and the time slot address occurrences from the generator 880. Occurrences of matches, in combination with instruction of central processor origin and signals from the detectors 815–817, are used to generate the controlling signals in sequence and with timing as previously discussed in relation to FIG. 11. A status and interrupt circuit 883, monitors the progress of S and S message transfer, data byte transfers, and control byte transfers, with reference to signals of detector and control origin, to generate timely interrupt signals whereby the central processor is informed of information exchange opportunities and requirements.

We claim:

1. A key telephone system for providing digital signal communication paths between a plurality of ports and for providing a signaling and supervision link between, any of said ports and a processing device in the key telephone system, comprising:
- a communication path being operable to provide n pairs of time division multiplex transmit (TDMT) and time division multiplex receive (TDMR) channels, each channel including a plurality of bit positions, at least one of said n pairs of TDMT and TDMR channels being exclusively associated with each port of said plurality of ports and each said TDMT channel and said TDMR channel including a signaling and supervision (S and S) bit position in said plurality of bit positions;
- a switching means being operable to couple communication signals between bit positions of selected ones of the TDMT channels and bit positions of selected ones of the TDMR channels, to the exclusion of said S and S bit positions, as directed by the processing device;
- an interface means for transferring information from the S and S bit position of a selected TDMT channel to the processing device and for transferring information from the processing device to the S and S bit position of at least one of the TDMR channels.

2. A key telephone system connectable to a plurality of apparatus including station apparatus and interface apparatus, each apparatus having a processing device for controlling functions of the apparatus, the key telephone system comprising:
- a plurality of ports, each port of said plurality being for connection of any apparatus of said plurality of apparatus
- synchronous communication medium for providing a bidirectional channel at each port of the plurality of ports, each bidirectional channel including a communications channel portion and a message channel portion;
- synchronous switch means for transferring information between communications channel portions of selected ones of the bidirectional channels in response to control signals;
- a central processor means for routinely identifying bidirectional channels from which a message from one of said processing devices is receivable, and in response to a received message, at least generating one of said control signals, and an address defining a bidirectional channel being associated with one of said apparatus for which a message for a corresponding said processing device is destined; and
- an interface means for detecting a request to send, in response to a first predetermined signal characteristic in one of the message channel portions which has been address defined by the central processor means, for soliciting and receiving a message via said message channel portion, and for transferring messages to message channel portions for which such messages are destined, as directed by the central processor means.

3. A method of operating a key telephone system having a central processor and a plurality of station apparatus having a processing device for controlling functions of the station apparatus in response to a key control action of a user origin and in response to messages received from the central processor, the method comprising the steps of:
(a) providing at least one bidirectional time division multiplex channel in association with each of the station apparatus;
(b) providing a bidirectional message channel within one bidirectional time division multiplex channel being in association with each of the station apparatus;
(c) routinely selecting one of said station apparatus for transmission of a message via its associated bidirectional message channel;
(d) exchanging call set up messages between the central processor, a calling station apparatus and a called station apparatus; and
(e) in response to a predetermined message, from the called station apparatus, synchronously exchanging information between the bidirectional time division multiplex channels associated with the calling and called station apparatus.

4. A method of signalling and supervision communication in a telephone system having a central processor and a plurality of ports, each port being available for connection of an apparatus, thereto, each port connected apparatus including, a processing device for controlling functions of the port connected apparatus, and an interface device for exchanging signals with the port in an operating signal format of the port, the method comprising the steps of:
(a) providing at least one time division multiplexed message channel exclusively in association with each one of the ports;
(b) routinely selecting one of said port connected apparatus for transmission of a message via its port associated message channel;
(c) exchanging messages, in a predetermined one of a plurality of message protocols, between the central processor and said port connected apparatus selected in step b.

5. A method of communicating signaling and supervision messages in stimulus and functional protocols in a telephone system having a central processor and a plurality of ports, each of the ports being available for connection of an apparatus including a processing device for controlling functions of the apparatus in response to reception of the signaling and supervision messages in one of said stimulus and functional protocols, and an interface device for exchanging signals in an operating signal format of the port, the method comprising the steps of:
(a) providing at least one time multiplexed message channel at each port of the plurality of ports;
(b) routinely selecting one of said ports for transmission of a message from its associated apparatus, and in the central processor receiving the transmission of said message in one of said stimulus and functional protocols;
(c) in the central processor, generating stimulus messages and functional messages in said stimulus and functional protocols exclusively;
(d) transmitting each of said stimulus messages exclusively to one of the plurality of ports,
(e) transmitting each of said functional messages to a lesser plurality of ports in the plurality of ports, said lesser plurality of ports being the ports which are available for connection of the apparatus including a processing device for controlling functions of the apparatus in response to reception of the signaling and supervision messages in the functional one of the protocols.

6. A method of operating a telephone system wherein signalling and supervision messages of higher and lower levels of protocol are exclusively compatible with functional terminal apparatus and stimulus terminal apparatus, respectively, the method comprising the steps of:
  (a) emulating a functional terminal on behalf of each stimulus terminal apparatus connected to the telephone system;
  (b) exchanging signalling and supervision messages of the lower level protocol exclusively between step (a) and a calling or a called one of the stimulus terminal apparatus;
  (c) relaying an incoming signalling and supervision message of the higher level protocol to each of the terminal apparatus with an exception being that of performing step (a) on behalf of a stimulus terminal for which said higher level protocol signalling and supervision message includes information.

7. A method of operating a telephone system as defined in claim 6 wherein said stimulus terminal apparatus is responsive solely to signaling and supervision messages characterized by a predetermined lower level protocol bit pattern corresponding to the lower level of protocol.

8. A method of operating a telephone system as defined in claim 7 wherein step (a) is invoked in response to an incoming signaling and supervision message characterized by the predetermined lower level protocol bit pattern.

9. A method of utilizing a feature apparatus in a telephone system having a central processor and a plurality of ports, each port of the plurality of ports being available for connection of any one of a plurality of apparatus thereto, each apparatus of the plurality of apparatus including a processing device for controlling functions of the apparatus, and an interface device for exchanging signals in an operating signal format of the port, the method comprising the steps of:
  (a) connecting one apparatus of the plurality of apparatus at one port of said plurality of ports, said one apparatus being a telephone station connecting said feature apparatus at another port of said plurality of ports;
  (b) providing at least one time multiplexed message channel in association with each of the ports;
  (c) routinely selecting each of said apparatus, connected in step (a), for transmission of a message via its port associated message channel;
  (d) in response to a feature request action of a user at said telephone station apparatus, exchanging messages between said telephone station apparatus, said feature apparatus and said central processor whereby said feature is provided by said feature apparatus on behalf of said telephone station apparatus.

10. In a telephone system having a central processor, a plurality of ports and a plurality of apparatus connected thereto, wherein each apparatus includes a processing device for controlling functions of the apparatus and an interface device for exchanging signals in an operating signal format of the plurality of the ports, a method of relocating an apparatus being connected at one port of the plurality of ports to being reconnected at any port of the plurality of ports, the method comprising the steps of:
  (a) providing a time multiplexed message channel in association with each of the ports;
  (b) routinely selecting each of said ports for transmission of a message from the apparatus connected thereto;
  (c) at each individual apparatus of the plurality of apparatus, in response to a first occurrence of step (b), transmitting a supervision message including an identifier unique to said individual apparatus;
  (d) in a location within the telephone system, generating and maintaining a record of port location in association with each said unique identifier;
  (e) in response to an occurrence of step (c) and in the event that said unique identifier is of record in step (d), recording an instant port location at which said apparatus is reconnected, whereby said apparatus is automatically operable at any port in the telephone system in response to its physical reconnection in the telephone system.

11. In a telephone system having a central processor, a plurality of ports and a plurality of apparatus connected thereto, wherein each apparatus includes a processing device for controlling functions of the apparatus and an interface device for exchanging signals in an operating signal format of the plurality of the ports, a method of relocating an apparatus being connected at one port of the plurality of ports to being reconnected at any port of the plurality of ports, the method comprising the steps of:
  (a) providing a time multiplexed message channel in association with each of the ports;
  (b) routinely selecting each of said ports for transmission of a message from the apparatus connected thereto;
  (c) at each individual apparatus of the plurality of apparatus, in response to a first occurrence of step (b), transmitting a supervision message including an identifier unique to said individual apparatus;
  (d) in a location within the telephone system, generating and maintaining a record of port location, characteristics, features and last signaled call status of the apparatus, in association with each said unique identifier;
  (e) in response to an occurrence of step (c) and in the event that said unique identifier is of record in step (d), recording an instant port location at which said apparatus is reconnected; and
  (f) downloading said characteristics, features and last signaled call status to the reconnected apparatus via the time multiplexed message channel associated with the port at which the apparatus is reconnected;
  whereby the apparatus is reconnectable without apparently altering any of said characteristics, and features.

12. A method of relocating an apparatus as defined in claim 11 wherein step (f) is invoked in response to said apparatus being physically reconnected at one of said ports within a predetermined period of time of having been disconnected from one of said ports.

13. In a telephone system having a central processor, a plurality of apparatus and a plurality of ports, some of the ports of the plurality of ports being connected with individual apparatus of the plurality of apparatus, each of the plurality of apparatus including a processing device for controlling functions of the apparatus and an interface device for exchanging signals in an operating signal format of the ports, a method of replacing one of the apparatus with another the apparatus at one port in a telephone system, comprising the steps of:
  (a) providing a time multiplexed message channel in association with each of the ports;

(b) routinely selecting each of said ports for transmission of a message from one of the apparatus of the plurality of apparatus, being connected thereto;

(c) transmitting a message including an identifier unique to said connected apparatus and an identifier unique to a predetermined type of said connected apparatus, in response to a first occurrence of step (b);

(d) maintaining a record of default features and characteristics of a plurality of predetermined types of apparatus connectable at the ports of the telephone system;

(e) generating and maintaining a record of features, characteristics said unique identifier and said type identifier in association with each of said port connected apparatus;

(f) in response to an occurrence of step (c) and in the event that said unique identifier differs from that last associated with any of said ports, performing one of, (i) downloading said characteristics and features to the instant port connected apparatus in the event that said type identifier corresponds to the type identifier which was made of record in step (e) and in step (e) altering the record of the unique identifier to correspond to the unique identifier of the instant port connected apparatus, and (ii) downloading type default features and characteristic, maintained in step (d), and corresponding to the type identifier of the instant port connected apparatus, in the event that the type identifier differs from that which was made of record in step (e), and in step (e) altering the record of the unique identifier and the type identifier to correspond to those of the instant port connected apparatus;

whereby one port connected apparatus may be replaced by another apparatus and be automatically operable in the telephone system.

14. A method of communicating signaling and supervision messages in stimulus and functional protocols in a telephone system having a central processor and a plurality of ports for connection of plurality of apparatus, each apparatus of the plurality of apparatus including a processing device for controlling functions of the apparatus in response to a reception of signaling and supervision messages in one of said stimulus and functional protocols, and an interface device for exchanging signals in an operating signal format of the port, the method comprising the steps of:

(a) providing a synchronous time division multiplexed message channel in exclusive association with each port;

(b) routinely selecting one of said ports for transmission of a message from its associated apparatus, and in the central processor receiving a message, from the selected apparatus, said message being in one of said stimulus and functional protocols;

(c) in the central processor, generating stimulus messages each of which is intended to be received by a particular one of the apparatus, and generating functional messages;

(d) transmitting each stimulus message generated in step (c) via the message channel which is exclusively associated with said particular apparatus for which the stimulus message is intended;

(e) transmitting each functional message generated in step (c) via a plurality of the message channels.

15. A method as defined in claim 11 wherein step (d) further includes:

generating and maintaining a record of a last signaled call status of the apparatus, in association with each said unique identifier; and in case where said call status is active, step (f) further includes:

reactivating said call status.

16. A method as defined in claim 14 wherein the plurality of message channels referred to in step (e) includes each one of the synchronized time division multiplexed message channels.

* * * * *